United States Patent Office 3,361,720
Patented Jan. 2, 1968

3,361,720
ISOCYANATE-BLOCKED, MERCAPTAN-FUNC-
TIONAL ORGANIC POLYSULFIDE POLY-
MERS, AND THEIR STABLE AND CURA-
BLE ADMIXTURES WITH CURING AGENTS
THEREFOR
Eugene R. Bertozzi, Yardley, Pa., assignor to Thiokol
Chemical Corporation, Bristol, Pa., a corporation of
Delaware
No Drawing. Continuation of application Ser. No.
383,917, July 20, 1964. This application Jan. 10,
1967, Ser. No. 608,461
25 Claims. (Cl. 260—77.5)

ABSTRACT OF THE DISCLOSURE

This disclosure relates to novel polymers, i.e., polysulfide polymers with mercaptan terminals blocked by monofunctional isocyanate compounds; the process for preparing such blocked polymers, and storable compositions containing such blocked polymers and curing agents.

The present invention relates to the organic polysulfide polymer art. In particular, the present invention relates to novel polysulfide polymer compositions and the process for their preparation wherein mercaptan-functional polysulfide polymers have their reactive mercaptan groups blocked by monofunctional organic isocyanates to form heat sensitive isocyanate-capped mercaptan group containing organic polysulfide polymers. This invention further relates to novel curable and time-stable admixtures of such capped polysulfides and curing agents of mercaptan-functional polysulfide polymers, and to the process for their preparation. This invention especially relates to such admixtures which comprise bin-stable polysulfide crude rubbers and curing agents therefor.

An object of this invention is to provide novel isocyanate-blocked mercaptan-functional polysulfide polymers and a novel method for their preparation.

Another object of this invention is to provide curable and stable one-package compositions of mercaptan-functional polysulfide polymers and curing agents therefor, and a novel method for their preparation.

Still another object of this invention is to provide bin-stable curable compositions of mercaptan-functional polysulfide crude rubbers in admixture with curing agents therefor.

Other objects of this invention are apparent from or are inherent in the following explanations and examples.

It has been expectedly discovered that the foregoing objects of the present invention are achieved through the preparation of novel isocyanate-blocked polysulfide polymers prepared by the reaction of mercaptan-functional polysulfide polymers with monofunctional isocyanates, and by the admixture of these blocked polymers with curing agents therefor.

Mercaptan-functional polysulfide polymers of the type disclosed in the Patrick and Ferguson patent, U.S. 2,466,963, are now well known in the art and have been extensively used for a variety of commercial applications, and when cured to form rubber-like solids, possess a number of commercially important properties. They are inert to oil, most solvents, water, mild acids and alkalies, as well as to ozone and sunlight. They are tough and resilient and retain their flexibility at extremely low temperatures. Moreover, they are impermeable to gases and moisture, and are capable of adhering tenaciously to such diverse materials as glass, metals, plastics, wood, leather, and fabrics. Because of these valuable properties, they have been extensively used as impregnating, sealing, caulking, and coating materials, as well as for a variety of uses such as to make gasoline hose, printer rolls, and potting compounds for electrical components.

Polysulfide polymers are characterized by recurring linkages of the type $-(S_x)-$ between organic radicals having at least two primary carbon atoms for connection to the polysulfide linkages, where $x$ is a number greater than one and usually not exceeding four, and most preferably two. Thus, for example, where $x$ is 2, disulfide polysulfide mercaptan-functional organic polymers may be designated by general structures corresponding to the formula

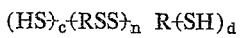

in which the "R"'s may be the same or different, as in the case of copolymers, and are organic radicals which have free valence bonds equal to one of the integers 2, 3, and 4. Such free valence bonds are attached to different carbon atoms on the radial R. Particularly useful classes of such R radicals are the alkylene radicals such as the ethylenically unsaturated aliphatic hydrocarbon radicals, the saturated aliphatic oxahydrocarbon radicals and thiahydrocarbon radicals, and the araliphatic hydrocarbon radicals in which the free valence bonds are in the aliphatic portion. A more comprehensive exposition of the specific types of useful R radicals is given in Tables I and II of U.S. Patent 2,789,958, which patent is included herein by reference. Such radicals may be generally characterized as intervening polyvalent organic radicals. The most preferable R radicals are predominantly alkylene, such as $-(CH_2CH_2)-$ and $-(CH_2CH_2CH_2CH_2)-$, oxahydrocarbon, such as $-(CH_2CH_2OCH_2CH_2)-$ and $-(CH_2CH_2OCH_2OCH_2CH_2)-$, and copolymeric R's of alkylene and oxahydrocarbon groups separated by $-(S_x)-$ groups. In the polymer formula above, $n$ is a number greater than 3 and large enough, and depending in good measure upon the nature and weight of the R groups, to provide a polymer with a molecular weight of at least 500. It may vary, in the case of liquid polymers, from about 3 to about 100, to provide polymers with molecular weights of about 500 to 12,000, that is, polymers that are normally liquids at about 25° C. In the case of solid polysulfide polymers, $n$ may vary from about 50 to several thousand to provide polymers with molecular weights in excess of about 12,000 to several million. In the formula, the sum $c+d$ is the average number of reactive mercaptan groups per polysulfide polymer molecule.

The mercaptan-functional polysulfide polymers which are commercially important are preferably formed by reaction of an organic dihalide, having an organic portion corresponding to the aforementioned R radicals, with an inorganic polysulfide $M-(S_x)$ M being a cationic species, preferably an alkali metal or alkaline earth metal, and often in the presence of a relatively minor amount, usually not in excess of about 4% by weight, of a polyfunctional crosslinking agent such as trichloropropane. The resultant solid latex-like polymers may, in the case of liquid products desired, be extensively split, or in the case of crude rubber products desired, be split in a more limited degree by the process of Patrick and Ferguson, U.S. Patent 2,466,963, which patent is included herein by reference. This latter patent lists a number of other patents which are also included herein by reference and which provide extensive descriptions of the formulation of solid mercaptan-functional organic polysulfide polymers such as latex-like materials and crude rubbers. The polysulfide polymers that are useful in the present invention, therefore, are those with molecular weights from 500 to several million, and which have a plurality of reactive mercaptan groups, e.g. the sum $c+d$, of at least an average of 1.5, and preferably about 2 to 10 per polymer molecule, and at most an average of 12, and which therefore span the range of liquid polysulfide polymers to polysulfide crude rubbers. Mixtures of the solid and liquid polymers may be used according to the present invention as well as either of the two types alone.

The polysulfide polymers useful in the present compositions and process are polysulfide polymers, as disclosed above, which are curable; that is to say, they have a plurality of reactive mercaptan groups which are capable of undergoing condensation and/or crosslinking and/or chain extension reactions to provide a substantially stable rubbery solid. These reactions are usually induced by compounds which are called curing agents, and which themselves form connecting bridges between polysulfide molecules at sites of the reactive mercaptan groups, and thus become part of the polymetric matrix; or they may merely induce reaction between reactive mercaptan groups on adjacent polysulfide molecules to provide condensation and/or crosslinking and/or chain extension bridges between said molecules at the mercaptan sites. The types and natures of such curing agents have been extensively studied and many are well known such as the metal oxides, chromates, dichromates, etc. and the organic oxidizing agents, sulfur, air, oxygen, epoxides, etc. All of these are usefully employed in the compositions of the present invention.

In general, the admixture of or contact of mercaptan reactive-group-containing polysulfide polymers with curing agents therefor, upon such admixture or contact, will produce such chemically dynamic systems which undergo the aforesaid crosslinking and/or condensation and/or chain extension reactions, commonly known as cure reactions, ultimately to produce with time solid crosslinked polysulfide rubbers. These systems, as has been indicated, are in a state of reaction, and as such do not have long-termed stability as workable curable admixtures. It is a usual practice, therefore, to admix curing agents with the polysulfide polymers just prior to the time when it is desired to obtain the cured polysulfide rubbers. Cure reactions, in general, depend on the type of polysulfide polymer, its mercaptan functionality, and the type and functionality of the curing agent, and proceed at temperatures which extend from common ambient temperatures, say about 60 to 90° F., to about 350° F. Even at such ambient temperatures as those commonly prevalent during storage of materials, e.g. 40 to 120° F., prior art admixtures of mercaptan-functional polysulfide polymers and curing agents therefore will to some degree cure and become unworkable within relatively short intervals, even in instances where such prior art systems at such temperatures usually require long intervals to fully cure to elastomers. It has been long desired in the art to have curable admixtures of polysulfide polymers and their curing agents in so-called "one-package systems" which may be stored at ambient temperatures for extended periods of time without substantial change in their workability and curable properties or bin stability. Until the advent of the present invention, this has not been possible.

In general, according to the present invention, the foregoing defined polysulfide polymers are reacted with monofunctional organic isocyanates to provide polysulfide polymers with isocyanate-blocked mercaptan groups. Curable admixtures of such blocked polymers may then be prepared with curing agents, which admixtures do not change substantially in curable properties over extended periods of time, often exceeding a year; and at the time desired for the forming of a polysulfide rubber the present admixtures may then be cured thereto at elevated temperatures of about 200 to 450° F. in about 0.1 to 50 hours.

The reactivity of the polysulfide polymers depicted by $(HS)_c(RS_x)_n R(SH)_d$ is importantly dependent upon the average number of mercaptan groups available for reaction, that is to say the sum $c+d$; this average sum is greater than one, and may be only fractionally greater, say 1.5 or 1.8, and yet still provide enough molecules with 2, 3, or even 12 mercaptan groups to permit vulcanization to rubbers with excellent properties. In general, the preferred average sum $c+d$ is about 2 to 10, and not less than about 1.5 to not more than about 12.

Isocyanate-blocked organic polysulfide polymers of the present invention are prepared by the reaction of monofunctional organic isocyanate with mercaptan-functional polysulfide polymers, as defined above, in accordance with the equation depicted as follows:

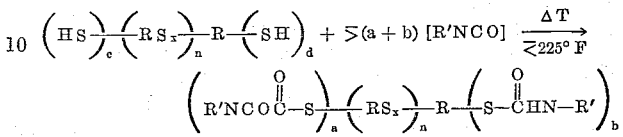

$$\left(HS\right)_c\left(RS_x\right)_n R\left(SH\right)_d + \ge(a+b)[R'NCO] \xrightarrow[\le 225° F]{\Delta T}$$
$$\left(R'NCO\overset{O}{\overset{\|}{C}}-S\right)_a\left(RS_x\right)_n R\left(S-\overset{O}{\overset{\|}{C}}HN-R'\right)_b$$

The blocking reaction is conducted at elevated temperatures above ambient of about 150 to about 225° F., in about 0.1 to about 10 hours. In general, the blocking reaction is to be conducted in the absence of materials which would be reactive with either mercaptan groups or with isocyanate groups, such as epoxides, water, alcohols, etc. It is desirable, therefore, to conduct the reaction in a relatively dry atmosphere, which is to say essentially devoid of water or water vapor, and to provide reactants which in themselves do not contain foreign substances, such as water, which would react with mercaptan or isocyanate.

Monofunctional isocyanates which are useful in the practice of the present invention may be generally designated as those having a formula depicted by R'NCO, wherein R' is a monovalent grouping that may be alkyl, aryl, alkaryl, or aralkyl in nature. Typical useful monofunctional organic isocyanates include, among the alkyl isocyanates, methyl isocyanate, ethyl isocyanate, propyl and isopropyl isocyanate, n-butyl isocyanate, octyl isocyanate, dodecyl isocyanate, etc.; and among the aryl isocyanates one may include phenyl isocyanate, 2-naphthyl isocyanate, p-ethoxyphenyl isocyanate, p-bromophenyl isocyanate, o-chlorophenyl isocyanate, m-chlorophenyl isocyanate, p-chlorophenyl isocyanate, o-ethoxyphenyl isocyanate, o-nitrophenyl isocyanate, 2-biphenyl isocyanate, m-nitrophenyl isocyanate, 4-biphenyl isocyanate, o-naphthoxyphenyl isocyanate, p-methoxyphenyl isocyanate, p-phenylazophenyl isocyanate, etc. The most useful monofunctional isocyanate presently found in the practice of the present invention is phenyl isocyanate. As may be seen from the foregoing equation, in order to provide completely blocked polysulfide compositions of the present invention, it is desirable to employ at least stoichiometrically reactive amounts of the monofunctional isocyanate with the mercaptan-functional polysulfide polymer used wherein $a+b$ equals at least $c+d$. In order to insure such complete blocking, it is often desirable to employ at least a slight excess of the isocyanate. Thus, if one mole of a difunctional mercaptan-functional polysulfide polymer is used, at least two moles of the isocyanate compound are required for complete blocking; and if the polysulfide polymer is pentafunctional, at least five moles of the isocyanate compound are then required for complete blocking. It is also contemplated, according to the practice of the present invention here taught, that partially-blocked polysulfide polymers, which may prove useful for specific end uses, may also be prepared according to the present process. To provide such partially-blocked polysulfide polymers, therefore, one would use less than a stoichiometric amount of isocyanate with the amount of mercaptan functional polysulfide used. The most useful partially-blocked polysulfide polymers of the present invention have at least 50% of their mercaptan groups blocked, e.g. where $a+b$ equals at least one-half $c+d$ in the equation. Where substantially less than 50% blocking occurs, the stability of curable compositions formed with curing agents therefor is sharply reduced, and approaches that of the prior art curable compositions.

In general, the stability of the present curable admixture compositions is importantly dependent upon not only the proportion of monoisocyanate used per mole of mercaptan-functional polysulfide polymer, but also upon the molecular weight of the polysulfide polymer, e.g. at least 500 for stable compositions, its functionality, the nature of R and R', and the nature of the adjuvants and impurities that may be present in the curable admixture compositions of the present invention. At any event, the stability of the present admixture compositions is substantially greater than that of otherwise identical compositions in which the polysulfide polymers have not been at-least-partially blocked with isocyanate.

The nature of curing agents which may be admixed with the present blocked polysulfide polymers to form the present curable and stable admixtures, has been alluded to above. Among the more useful curing agents for liquid polysulfide polymers, say of molecular weight from about 500 to 12,000, may be included $Sb_2O_3$, $MgO_2$, $TeO_2$, $SeO_2$, $MnO_2$, $MnO_2$ coated with manganite, $PbO_2$, organic peroxides, nitro-aryl compounds, etc. Curing agent systems for relatively high molecular weight polysulfide polymers, including the solid polymers such as crude rubbers, in addition to the aforementioned curing agents, include such compositions as zinc oxide, quinone dioxime, tincture of iodine, calcium oxide, and those other curing agents listed in the various patents included herein by reference.

The foregoing curing agents are used according to the present invention, individually, or in combinations of more than one, in quantities sufficient to substantially oxidize all of the mercaptan groups, as present in the polysulfide polymers prior to blocking. In general, amounts of curing agents useful to provide such substantially complete oxidation may vary from about 0.5 to in excess of 20 parts by weight per 100 parts by weight of the polysulfide polymer to be cured. To effect cures of the present admixtures, which are prepared merely by admixture as on a mill to provide an intimate and uniform blend of the blocked polysulfide polymers and the curing agents therefor, substantial unblocking of the blocked polymers is required. This may be depicted by the following equation:

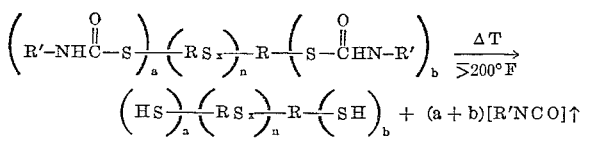

Unblocking requires elevated temperatures above ambient, usually above the volatilization temperature of R'NCO, and usually falling into the range of about 200 to about 450° F. for about 0.1 to about 5 hours. At these elevated temperatures, as soon as the unblocking reaction occurs, the newly reconstituted mercaptan groups will react under the influence of the curing agents to provide the necessary condensation and/or crosslinking and/or chain extention reactions, known as curing or vulcanization reactions, which provide solid cured rubbery polymers. These curing reactions are permitted to proceed at the foregoing temperatures until such time as stable rubbery vulcanizates are produced.

The following examples illustrate modes of practice to prepare the compositions, and to conduct the processes of the present invention, but are not intended to impose limitations upon the scope of the invention which is defined in the appended claims.

*Example 1.—Preparation and cure of IBLP–3, an isocyanate-blocked liquid polysulfide polymer of about 1000 molecular weight*

A 2-liter, 3-necked reaction flask fitted with stirrer, condenser with drying tube open to the atmosphere, and a gas admission tube for providing a blanket of dry gas therein, was sequentially charged with agitation with 1 mol of LP–3 polymer, a liquid dimercaptan-functional polysulfide polymer of molecular weight of about 1000, previously dried of water, having as its repeating unit

and having a 2% crosslink provided by trichloropropane, and with 2.2 mols of phenyl isocyanate under a blanket of dry nitrogen gas. The reaction mixture was elevated to 192 to 203° F. and maintained there for about 5 hours and then cooled to ambient to provide IBLP–3, an isocyanate-blocked liquid polysulfide polymer of this invention. IBLP–3 was of similar color but slightly more viscous than LP–3 polymer.

The blocked liquid polysulfide polymer IBLP–3 was uniformly admixed with lead dioxide, a curing agent for mercaptan-functional polysulfide polymers, in quantity of 7.5 parts by weight per 100 p.b.w. of polymer. The curable composition was permitted to stand at ambient temperatures of about 75° F. and at the end of at least 16 hours no perceptible signs of cure, such as thickening of the composition, was observed. Admixtures of prior art non-blocked mercaptan-functional polysulfide liquid polymers and lead dioxide of otherwise identical constitution to the present composition completely cured to form solid rubbers at about 75° F. in from 1 to at most 4 hours. The present composition was then heated at about 212° F. for about 30 minutes to provide a fully cured rubbery polysulfide vulcanizate.

*Example 2.—Preparation of IBLP–2, an isocyanate-blocked liquid polysulfide polymer of about 4000 molecular weight*

In similar manner to Example 1, 1 mol of LP–2 polymer, a dimercaptan-functional polysulfide polymer similar to LP–3 polymer in all ways but having a molecular weight of about 4,000, was reacted with about 2.2 mols of phenyl isocyanate to provide IBLP–2, an isocyanate-blocked liquid polysulfide of this invention that was of similar color but more viscous than LP–2 polymer. IBLP–2 in admixture with curing agents was capable of long-termed stability at ambient storage temperatures, and cure to a fully vulcanized rubber at temperatures of about 150 to 400° F. within 0.1 to 6 hours.

*Examples 3 to 12.—Preparation and cure of IBSTCR, an isocyanate-blocked polysulfide crude rubber*

Mercaptan-functional polysulfide crude rubbers, which usually have molecular weights in excess of 100,000 to about 2 million have relatively poor bin-stability, which is to say that upon relatively short-termed storage either in admixture with curing agents therefor or even in contact with air, the oxygen of which acts as a slow curing agent therefor, the rubbers will cure to the degree that they can no longer be worked on a mill so as to permit admixture with necessary compounding ingredients, and cannot be formed to the shape of end desired vulcanized articles. In essence they lose the needed piezo-thermoplasticity to be worked prior to cure.

In the following examples, a decyl-mercaptan-functional polysulfide crude rubber designated STCR, formed with repeating units of $\{C_2H_4OCH_2OC_2H_4SS\}$ and a 2% crosslink imparted by trichloropropane, was compounded with various ingredients on a rubber mill at ambient temperatures, and observed as to its bin stability. In Example 3, no curing agents were used. In Examples 3, 5, 7, and 9, a small quantity of IBLP–3, prepared as in Example 1 was added, which contained enough free excess phenyl isocyanate from the blocking step to substantially block all of the mercaptan groups of the STCR crude rubber. In Examples 4 to 9 sundry curing agents and mixtures were used, and are designated in the table of example as C–1, which is quinone dioxime (GMF),
C–2, zinc oxide,
C–3, 2% tincture of iodine and
C–4, lead dioxide.

A portion of each of the milled rubber stocks was stored at ambient temperatures and observed daily for loss of workable properties, or bin stability. Another portion of the milled stocks was cured at 287° F. for 30 minutes to be tested for vulcanizate properties.

To prepare the stocks, two masterbatches were prepared on a rubber mill according to the recipes:

Masterbatch A:
  STCR _____p.b.w__ 100
  Stearic acid _____p.b.w__   1
  Carbon black, SRF #3 _____p.b.w__  60

Masterbatch B:
  STCR _____p.b.w__  97
  Stearic acid _____p.b.w__   1
  Carbon black, SRF #3 _____p.b.w__  60
  IBLP-3 _____p.b.w__   3

The masterbatches were then heated for about 24 hours at about 200° F. to remove traces of moisture, and to aid in completion of the blocking of the crude rubber in Masterbatch B. The masterbatches were then cooled to ambient. The aforesaid curing agents were then milled into the masterbatches at ambient temperatures in the quantities listed in the table of examples to provide curable compounded crude rubber stocks. A portion of each stock was stored at ambient temperatures and observed daily for loss of bin stability. Another portion was vulcanized to provide cured rubbers with properties as listed below.

I claim:
1. A monofunctional - isocyanate - blocked mercaptan-functional organic polysulfide polymer corresponding to the formula:

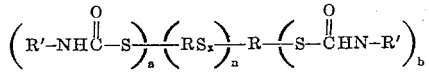

wherein
$a+b$ is a positive number equal to at least one-half $c+d$,
$c+d$ is a positive number exceeding one and not substantially greater than twelve and is the number of mercaptan groups of the organic polysulfide polymer corresponding to the formula

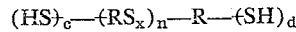

which organic polysulfide polymer has been reacted with an organic monofunctional isocyanate compound to form said monofunctional-isocyanate-blocked mercaptan - functional organic polysulfide polymer;

$n$ is a positive number sufficient to provide said polysulfide polymer with a molecular weight of at least 500;

$x$ is a number greater than one and not substantially exceeding four;

R' is a monovalent organic group selected from the class of monovalent organic groups consisting of alkyl, aryl, alkaryl and aralkyl monovalent groups; and R is an intervening organic radical having a valence equal to one of the integers 2, 3, and 4 and is selected from the group of organic radicals selected from the group consisting of alkylene radicals, ethylenically unsaturated aliphatic hydrocarbon radicals, saturated aliphatic oxahydrocarbon and thiahydrocarbon radicals, and araliphatic hydrocarbon radicals in which the valences are in the aliphatic portion.

2. A monofunctional - isocyanate - blocked mercaptan-functional polysulfide polymer according to claim 1 which is normally a liquid polymer at 25° C.

3. A monofunctional - isocyanate - blocked mercaptan-functional polysulfide polymer according to claim 1 which is normally a solid polymer at 25° C.

4. A monofunctional - isocyanate - blocked mercaptan-functional polysulfide polymer according to claim 1 wherein said R' is a phenyl group.

5. A monofunctional - isocyanate - blocked mercaptan-functional polysulfide polymer according to claim 1 wherein said number $a+b$ is equal to at the least said number $c+d$.

6. A monofunctional - isocyanate - blocked mercaptan-functional polysulfide polymer according to claim 1 wherein said R is 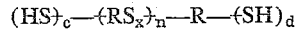.

7. A monofunctional - isocyanate - blocked mercaptan-functional polysulfide polymer according to claim 1 wherein said $x$ is about 2.

8. A monofunctional - isocyanate - blocked mercaptan-functional polysulfide polymer according to claim 1 wherein said $a+b$ is about 2.

9. A monofunctional - isocyanate - blocked mercaptan-functional polysulfide polymer according to claim 1 wherein said $a+b$ is about 10.

10. A process for preparing a monofunctional-isocyanate - blocked mercaptan - functional organic polysulfide polymer comprising the steps of
(i) admixing to uniform admixture at least one unblocked polysulfide polymer of the formula $$(HS)_c\text{—}(RS_x)_n\text{—}R\text{—}(SH)_d$$

wherein $c+d$ is a positive number exceeding one and not substantially exceeding twelve,

|  | Example | | | | | | |
|---|---|---|---|---|---|---|---|
|  | 3 | 4 | 5 | 6 | 7 | 8 | 9 |
| Recipe, in parts by weight (p.b.w.): | | | | | | | |
| Type of masterbatch [1] | B | [6] A | [6] B | A | B | A | B |
| Amount of masterbatch | 161 | 161 | 161 | 161 | 161 | 161 | 161 |
| Type of curing agent [1] | | C1 & 2 | C1 & 2 | C2 & 3 | C2 & 3 | C4 | C4 |
| Amount of curing agent | 0.0 | 1.5 & .5 | 1.5 & .5 | 1.5 & .5 | 1.5 & .5 | 3 | 3 |
| Uncured stocks: | | | | | | | |
| Bin stability, in days | >500 | 66 | 500 | 17 | 500 | 3 | 491 |
| Mooney viscosity, ML-4 [2] initial upon preparation | 25 | | | | | | |
| Vulcanizate Properties: | | | | | | | |
| Tensile strength, in p.s.i. [3] | ([5]) | 1,100 | 850 | 1,200 | 1,100 | 1,190 | 960 |
| Ultimate elongation, in p.s.i. [3] | ([5]) | 300 | 360 | 390 | 420 | 250 | 310 |
| Hardness, in Shore A durometer degrees [4] | ([5]) | 65 | 58 | 64 | 59 | 68 | 62 |

[1] As in text.
[2] Test method ASTM D-1646-59T.
[3] Test method ASTM D-412-51T.
[4] Test method ASTM D-676-59T.
[5] No cure.
[6] 2 p.b.w. of stearic acid added to recipe.

R is an intervening organic radical having a valence equal to one of the integers 2, 3, 4, and is selected from the group of organic radicals selected from the group consisting of alkylene radicals, ethylenically unsaturated aliphatic hydrocarbon radicals, saturated aliphatic oxahydrocarbon and thiahydrocarbon radicals, and araliphatic hydrocarbon radicals in which the valences are in the aliphatic portion, $x$ is a number greater than one and not substantially exceeding four, and $n$ is a positive number sufficient to provide said organic polysulfide polymer with a molecular weight of at least 500, with an organic monoisocyanate of the formula

R'NCO wherein

R' is a monovalent organic group selected from the class of monovalent organic groups consisting of alkyl, aryl, alkaryl, and aralkyl monovalent groups, and wherein said isocyanate is present in a quantity of $a+b$ mols per mol of said polysulfide polymer, and further wherein said number $a+b$ is equal to at least one-half the number $c+d$, (ii) heating said admixture to a temperature of about 150 to 225° F. for about 0.1 about 10 hours to provide monofunctional - isocyanate- blocked mercaptan-functional organic polysulfide polymer, said steps (i) and (ii) being conducted under substantially anhydrous conditions, and (iii) cooling to temperatures below 150° F. said monofunctional - isocyanate - blocked mercaptan - functional organic polysulfide polymer.

11. A process according to claim 10 wherein said unblocked organic polysulfide polymer is normally a liquid polymer at 25° C.

12. A process according to claim 10 wherein said unblocked organic polysulfide polymer is normally a solid polymer at 25° C.

13. A process according to claim 10 wherein said at least one unblocked organic polysulfide polymer is a mixture of at least on liquid polysulfide polymer, and at least one solid polysulfide polymer.

14. A process according to claim 10 wherein said at least one mono-functional-isocyanate-blocked mercaptan-functional organic polysulfide polymer is a mixture of at least one liquid isocyanate-blocked mercaptan-functional polysulfide polymer and at least one solid isocyanate-blocked mercaptan-functional polysulfide polymer.

15. A process according to claim 10 wherein said number $a+b$ is equal to at least $c+d$.

16. A process according to claim 10 wheerin said R is .

17. A process according to claim 10 wherein said R' is a phenyl group.

18. A process according to claim 10 wherein said $x$ is about 2.

19. A process according to claim 10 wherein said $a+b$ is about 2.

20. A process according to claim 10 wherein said $a+b$ is about 10.

21. A method for preparing a storage-stable curable polysulfide polymer admixture composition comprising the steps of (A) Preparing at least on monofunctional-isocyanate-blocked mercaptan-functional organic polysulfide polymer according to the steps of claim 36, and (B) admixing to uniform admixture with said polymer at least one curing agent for mercaptan-functional organic polysulfide polymers in such quantity as to provide for substantial oxidation of the mercaptan groups as present in the mercaptan-functional polysulfide polymer employed in the preparation of said isocyanate-blocked polysulfide polymer.

22. A method according to claim 21 wherein said quantity of curing agent is from about 0.5 to 20 parts by weight of said curing agent for each 100 parts by weight of said monofunctional-isocyanate-blocked mercaptan - functional polysulfide polymer.

23. A method according to claim 21 wherein said at least one curing agent is lead dioxide.

24. A method according to claim 21 wherein said at least one curing agent is quinone dioxime.

25. A method according to claim 21 wherein said at least one curing agent is zinc oxide.

References Cited

UNITED STATES PATENTS

| 2,466,963 | 4/1949  | Patrick et al. | 260—79.1 |
| 2,676,165 | 4/1954  | Fettes         | 260—79.1 |
| 2,764,592 | 9/1956  | Seeger et al.  | 260—453  |
| 2,789,958 | 4/1957  | Feltes et al.  | 260—79.1 |
| 2,814,600 | 11/1957 | Mitchell       | 260—77.5 |
| 3,282,902 | 11/1966 | Panek          | 260—79   |
| 3,201,372 | 8/1965  | Wagner         | 260—453  |

OTHER REFERENCES

Gaylord: "Polyethers," Part III, Interscience Publishers, 1962, pp. 75, 82 and 83.

DONALD E. CZAJA, *Primary Examiner.*

LEON J. BERCOVITZ, *Examiner.*

M. I. MARQUIS, *Assistant Examiner.*